US007004618B2

(12) United States Patent
Gartsbeyn

(10) Patent No.: US 7,004,618 B2
(45) Date of Patent: Feb. 28, 2006

(54) TIMER SETTING MECHANISM FOR MECHANICAL DEREEFER

(75) Inventor: Yakov Gartsbeyn, East Longmeadow, MA (US)

(73) Assignee: Capewell Components Company, LLC, South Windsor, CT (US)

( * ) Notice: Subject to any disclaimer, the term of this patent is extended or adjusted under 35 U.S.C. 154(b) by 284 days.

(21) Appl. No.: 10/352,677

(22) Filed: Jan. 28, 2003

(65) Prior Publication Data

US 2004/0145972 A1 Jul. 29, 2004

(51) Int. Cl.
*B64D 17/58* (2006.01)

(52) U.S. Cl. .......................... 368/97; 368/10; 244/150

(58) Field of Classification Search ................. 368/89, 368/97, 101, 139, 227, 232, 10, 185; 244/142, 244/152, 149, 150; 119/51.11–51.15
See application file for complete search history.

(56) References Cited

U.S. PATENT DOCUMENTS

| | | | | |
|---|---|---|---|---|
| 2,525,607 | A * | 10/1950 | Kuntz | 254/364 |
| 3,137,272 | A * | 6/1964 | Lepper | 119/51.12 |
| 3,232,274 | A * | 2/1966 | Chatfield et al. | 119/51.12 |
| 3,646,912 | A * | 3/1972 | Gardner | 119/51.12 |
| 3,935,837 | A * | 2/1976 | Mulhern | 119/51.12 |
| 4,279,392 | A * | 7/1981 | Saxton | 244/150 |
| 4,783,027 | A * | 11/1988 | Jones | 244/149 |
| 4,908,807 | A * | 3/1990 | Jauch | 368/89 |
| 6,122,227 | A * | 9/2000 | Kuo | 368/109 |
| 6,257,524 | B1 * | 7/2001 | Fitzgerald et al. | 244/142 |

* cited by examiner

*Primary Examiner*—Kamand Cuneo
*Assistant Examiner*—Jeanne-Marguerite Goodwin
(74) *Attorney, Agent, or Firm*—Alix, Yale & Ristas, LLP

(57) ABSTRACT

A setting mechanism for a triggering device employs a knob fixed to a rotating part of the triggering device. The knob carries a selector lever that is pivotable to radially project from the knob in angularly spaced directions. Arcuate walls surround the knob to define gaps corresponding to alternative rotational periods for the knob. The selector is pivoted to travel in one or the other gap. The selected rotational period may correspond to a predetermined time.

21 Claims, 7 Drawing Sheets

TIMER SETTING MECHANISM FOR MECHANICAL DEREEFER

BACKGROUND OF THE INVENTION

1. Field of the Invention

This invention relates generally to a device for selectively holding and releasing reefing lines on parachute canopies or the like, and more particularly to a timer setting mechanism for such dereefing devices.

2. Description of the Related Art

The use of parachutes, either for air dropping heavy payloads or decelerating high-speed aircraft, requires the incorporation of suitable means to regulate the opening of the various parachute canopies. If not regulated, deceleration of the payload caused by rapid parachute canopy opening may be excessive, imposing potentially destructive forces on the attached payload. Additionally, for payloads delivered using multiple parachutes, the opening of each parachute must be controlled so that no single parachute interferes with, or “starves”, the opening of the remaining parachutes.

To control the opening rate of each parachute canopy, so-called reefing lines are employed, typically encircling the rim of the parachute canopy. The reefing lines are held by a dereefing device and the reefing line is sized so that the parachute canopy cannot fully open as long as the reefing line ends are held by the dereefing device. The dereefing devices are associated with timers or barometrically controlled devices, which after a given time or at a given altitude release the reefing line ends, enabling full opening of the associated parachute canopy. Multiple, differently sized reefing lines may be used for each parachute canopy, with each reefing line released sequentially so that the canopy can be opened in controlled stages, allowing further control over payload deceleration.

Dereefing devices can generally be classified into either destructive or nondestructive types. The destructive types include those using explosive charges or mechanically actuated blades to sever the reefing line. Destructive dereefing devices do not allow reuse of the reefing line and/or the dereefing devices themselves. Nondestructive reefing devices typically capture a reefing line end loop around a pin. The pin is releasably held within a yoke. The pin is withdrawn from the yoke to release the dereefing line end loops.

Some nondestructive dereefing devices utilize mechanical timers to determine the release point for the mechanical dereefer. There is a need in the art for a timer-setting mechanism which ensures accurate and repeatable timer setting and actuation.

SUMMARY OF THE INVENTION

A preferred embodiment of a timer-setting mechanism comprises a knob mounted to the shaft of a mechanical timer. The knob carries a pivotable selector lever in a slot that permits the lever to pivot over an arc of 180° between first and second timing selection positions where the lever radially projects from opposite sides of the knob. Two arcuate walls, which in a preferred embodiment project from a dereefer housing, partially surround the assembled knob/lever/timer shaft. Each arcuate wall extends around the knob between a start face and a timeout face. The arcuate walls are arranged such that the timeout faces are associated with the same rotational position of the knob and attached timer shaft as will be further explained below. Arcuate gaps are defined between the start face of a first arcuate wall and the timeout face of the second arcuate wall. The arcuate gaps have first and second arcuate lengths, with a first gap having an arcuate length, for example, associated with a timer setting of four seconds and a second smaller gap having an arcuate length associated with a timer setting of, for example, two seconds.

To select the representative two- or four-second timer settings discussed above, the selector lever is pivoted to radially project from the knob into the shorter or longer arcuate gap, respectively. The selector lever and knob are equipped with means for releasably retaining the selector lever in a position projecting into the selected gap as will be further explained below. When at rest (e.g., before the timer is wound or set), the selector lever will be adjacent the timeout face of one or the other arcuate gap. When the desired release time is selected by pivoting the lever, the radially projecting selector lever may then be used to rotate the knob and thus the timer shaft to wind or set the mechanical timer.

The arcuate walls and knob define release pin holes and receiving apertures, respectively. A pair of holes and apertures align when the knob is rotated such that the selector lever is against the selected start face, e.g., when the timer is set. One pair of release pin hole and receiving aperture are associated with each timer set position. When the timer is set, a release pin is inserted through the release pin hole defined by an arcuate wall and into the receiving aperture defined by the knob to maintain the knob (and hence the timer) at the desired setting until released by removal of the release pin. Once released, the timer counts down the selected time and actuates the mechanical dereefer when the selector lever reaches the timeout face defining the end of the of the selected release time.

DETAILED DESCRIPTION OF THE PREFERRED EMBODIMENT

Figure 1:
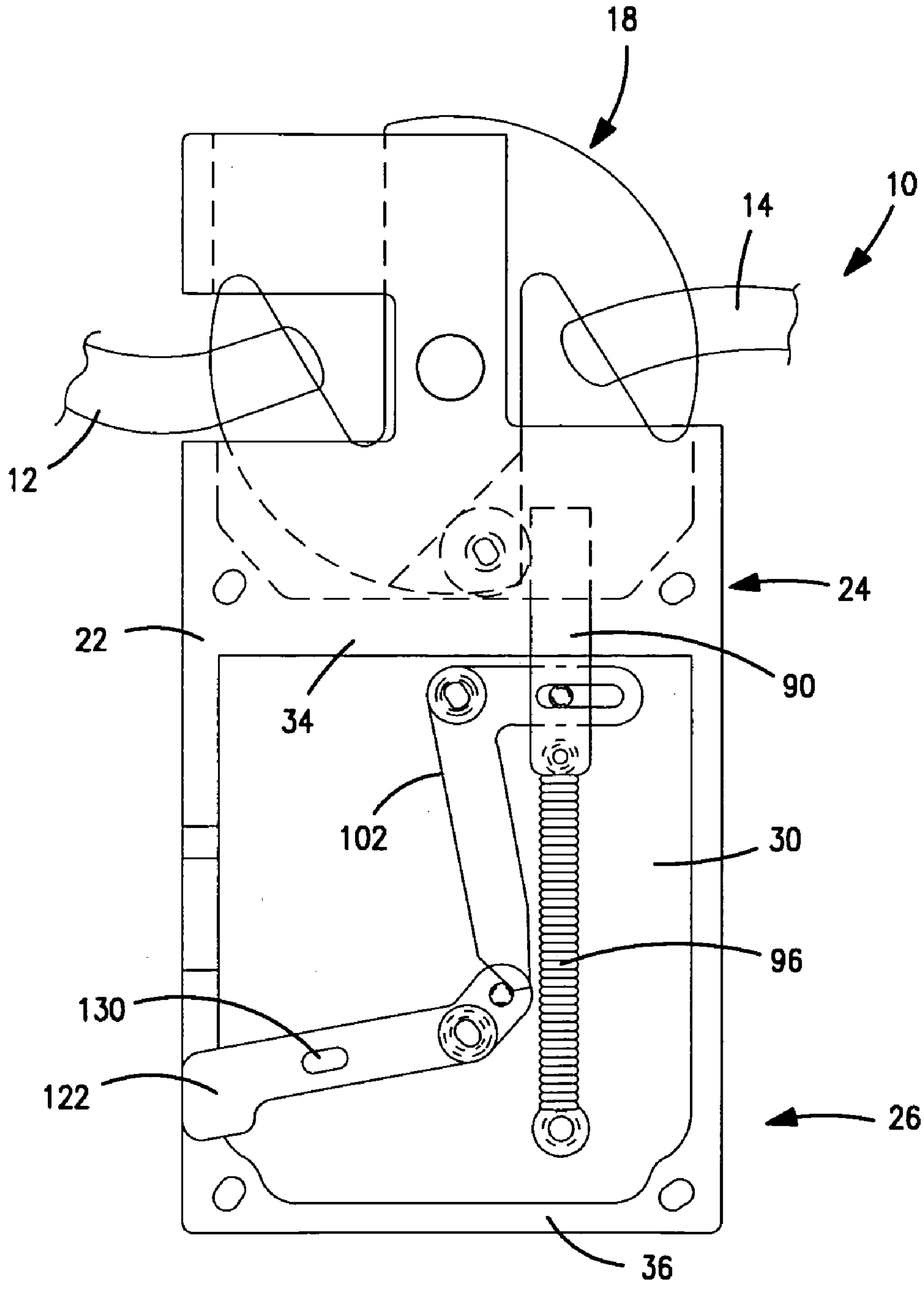
FIG. 1 is a plan view with a cover removed and partly in phantom of a prior art mechanical dereefer with the latch maintained in the capture position.

Reference is made to FIG. 1 for the purpose of introducing one preferred use environment for a setting mechanism in accordance with the present invention. FIG. 1 illustrates a prior art mechanical dereefer 10 comprising a frame 22 with a bifurcated portion 24 and an opposing housing portion 26. The housing portion 26 includes walls that define a frame cavity 30. Within the frame cavity 30 are arranged mechanical linkages 122, 102, 90 and spring 96. The bifurcated portion 24 of the housing pivotably retains a latch 18, which in FIG. 1 is shown in the capture position with reefing line end loops 12, 14 held between the latch 18 and the bifurcated portion 24 of the dereefer housing. A latch lock 90 projects through an aperture in the housing 22 to maintain the latch 18 in the capture position as illustrated in FIG. 1. A triggering device (shown separately) is arranged in the housing cavity 30 to engage an aperture 130 in the trigger link. The triggering device may be a barometrically controlled device or a mechanical timer.

At the selected altitude or, in the case of a timer, after the selected time has elapsed, the triggering device will act on the triggering link which in turn releases the latch lock 90 which is retrieved by the spring 96 to release the latch 18 and free the reefing line ends 12, 14.

It should be understood that the prior art mechanical dereefer illustrated in FIG. 1, its configuration and release mechanism, do not form part of the present invention and are shown for the purposes of illustrating one possible use environment for a setting mechanism in accordance with the present invention.

Figure 8:
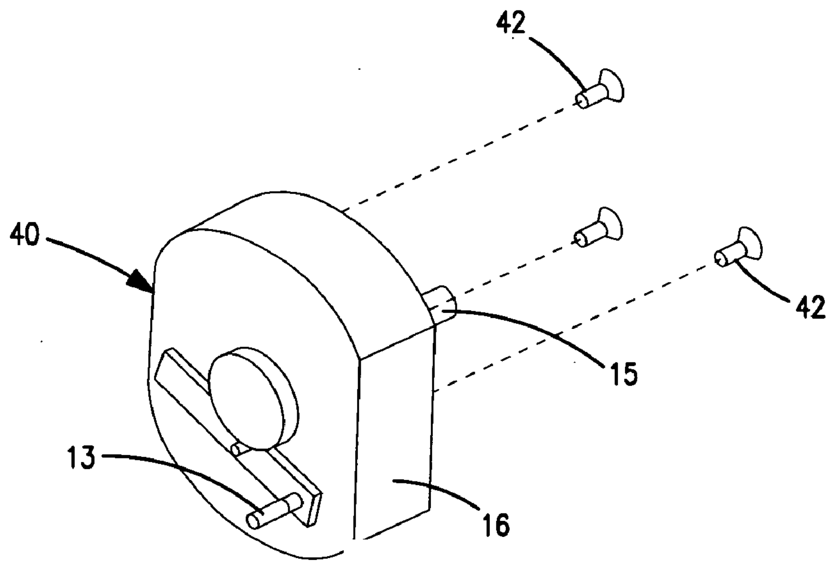
FIGS. 8 and 9 are front and rear side perspective views of a mechanical timer suitable for use in association with the timer-setting mechanism of the present invention.
Figure 9:
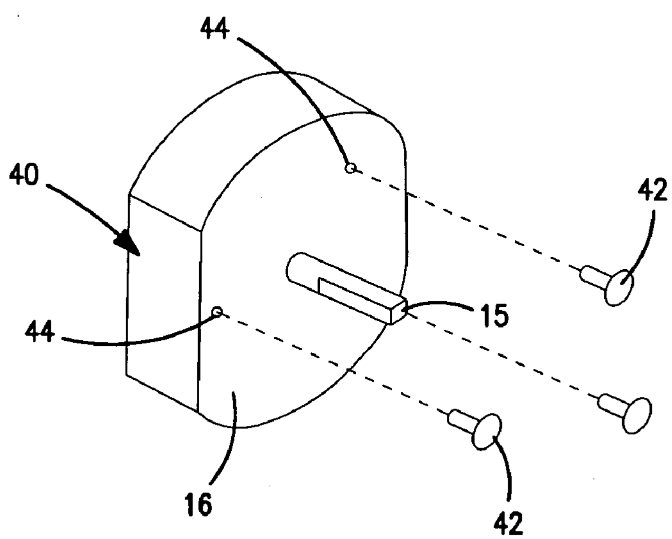

FIGS. 8 and 9 illustrate a mechanical timer 16 suitable for use in conjunction with the present invention. The mechanical timer 16 has a shaft 15 projecting from one side of the timer body 40. A triggering projection 13 fixed to a lever arm projects from a face of the timer body 40 opposite the timer setting shaft 15. Fasteners 42 engage fastener receptacles 44 to fix the timer body 40 to, for example a dereefer such as that illustrated in FIG. 1. It will be understood that many suitable triggering devices are available and the form and features of the illustrated mechanical timer 16 do not form any part of the present invention and are introduced for the purpose of discussing the invention.

Figure 2:
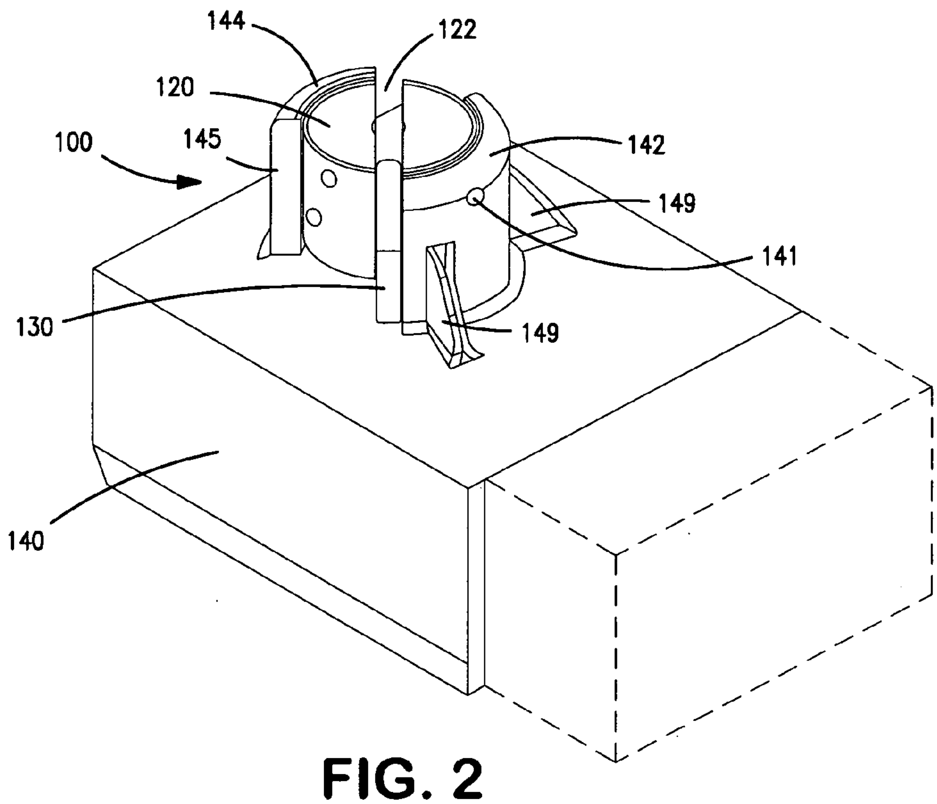
FIG. 2 is a perspective view, partly broken away and shown in phantom, of a mechanical dereefer housing equipped with a timer setting mechanism in accordance with the present invention.
Figure 3:
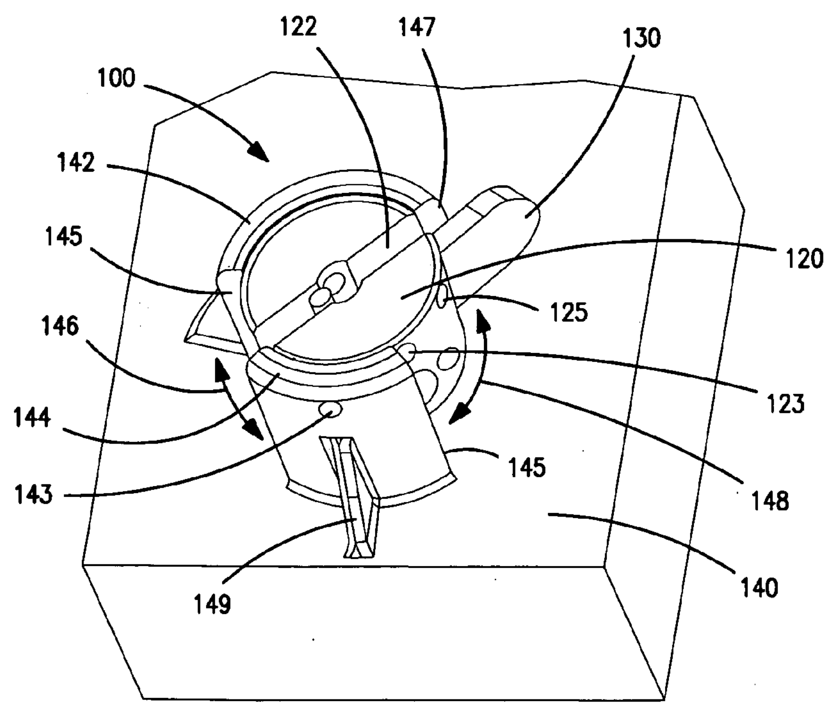
FIG. 3 is an alternative perspective view of the dereefer housing and timer-setting mechanism of FIG. 2.
Figure 4:
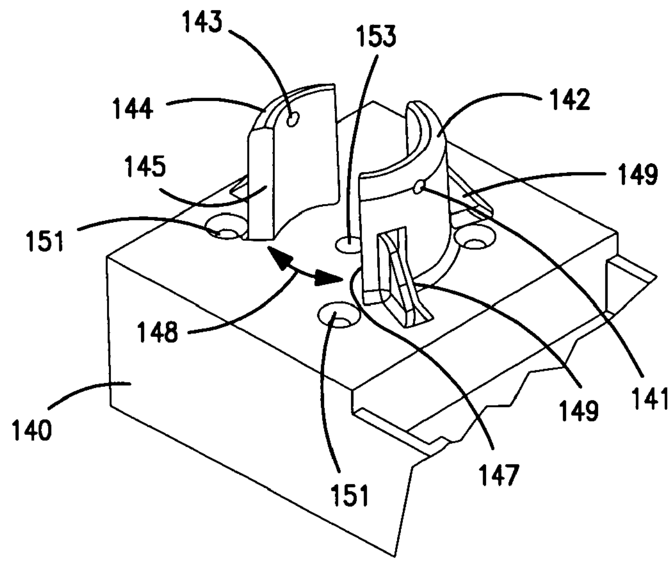
FIG. 4 is a perspective view, partly broken away, of a dereefer housing equipped with arcuate walls in accordance with the present invention.

FIGS. 2 and 3 illustrate one preferred embodiment of a setting mechanism 100 in accordance with the present invention. The setting mechanism 100 comprises a knob 120 engagable with a triggering device such that the rotational period of a rotating part of the triggering device may be selected by limiting rotary movement of the knob. The knob 120 is diametrically bisected by a slot 122. A selector lever 130 pivots in the slot 122 to alternatively project from opposite sides of the knob 120. The illustrated lever/knob assembly 120, 130 is partially surrounded by two arcuate walls 142, 144 projecting from a representative housing 140. Together, the arcuate walls 142, 144 define two gaps 146, 148 of different angular extent. Each gap 146, 148 extends from a start face 145 to a timeout or triggering face 147.

In the illustrated embodiment, the arcuate walls 142, 144 and knob/lever assembly 120, 130 and are arranged such that the radially projecting selector lever 130 comes to rest against one or the other timeout face 147 at the end of the selected rotational period. This position of the selector lever 130 against a timeout face 147 coincides with the triggering of the triggering device (not shown here). FIGS. 2 and 3 illustrate the selector lever 130 pivoted to radially project into the longer gap 148 and at rest against the timeout face 147 of the longer arcuate wall 142.

The difference between the length of the gaps 146, 148 is permits the setting device to provide two alternative rotational periods for the knob 120 and, ultimately a rotating part of a triggering device. This rotating part may be the shaft 15 of a mechanical timer 16 such as that illustrated in FIGS. 8 and 9. For example, if the illustrated setting device were connected to the shaft 15 of the mechanical timer 16, the shorter gap 146 might be associated with a time of two seconds and the longer gap 148 might be associated with a time of four seconds. With the selector lever in the position illustrated in FIGS. 2 and 3, clockwise rotation of the knob to bring the selector lever to bear against the start face 145 of the longer gap 148 would set the mechanical timer 16 for a four-second trigger time.

Each of the arcuate walls 142, 144 defines a hole 141, 143 which is complementary to and aligned with a particular associated aperture 123, 125 in the knob 120 when the selector lever 130 is adjacent one of the start faces or abutments 145. For example, one complementary pair of release pin hole 143 and aperture 123 align for a knob position corresponding to the selector lever 130 bearing against the start face 145 of the longer arucate gap 148. With the selector lever 130 positioned against a selected start face 145, a release pin is inserted through the aligned hole 143 to engage the complementary aligned aperture 123 in the knob 120. The pin (not illustrated) maintains the setting mechanism in the selected set position until activated by removal of the release pin. It will be understood by those of skill in the art that the pin may be released by a static line, a reefing line, the opening of another parachute canopy or the like. Once activated, the rotating part of a triggering device is free to move toward its trigger position.

It will be understood by those of skill in the art that other means for maintaining the setting mechanism in its selected set position are readily applicable to the present invention.

Figure 5:
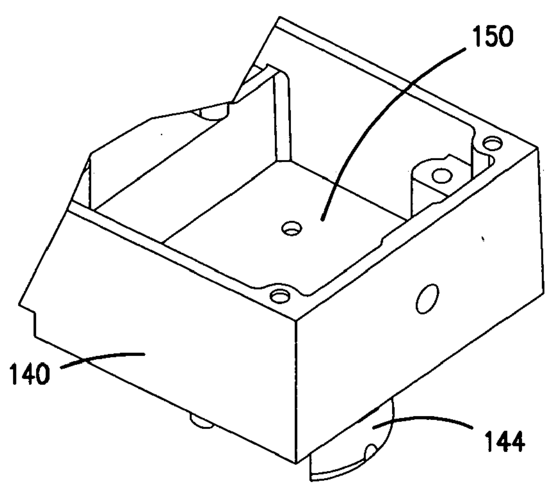
FIG. 5 is a perspective view partly broken away of the dereefer housing of FIG. 4 in reverse view.
Figure 6:
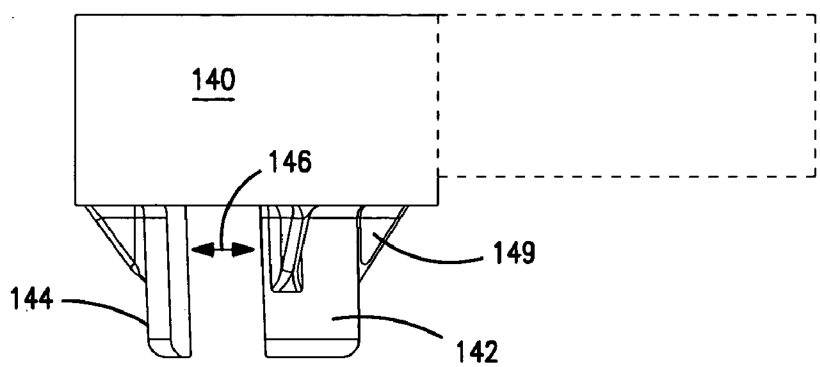
FIG. 6 is a side view, partly broken away and partly shown in phantom, of the dereefer housing illustrated in FIG. 4.
Figure 7:
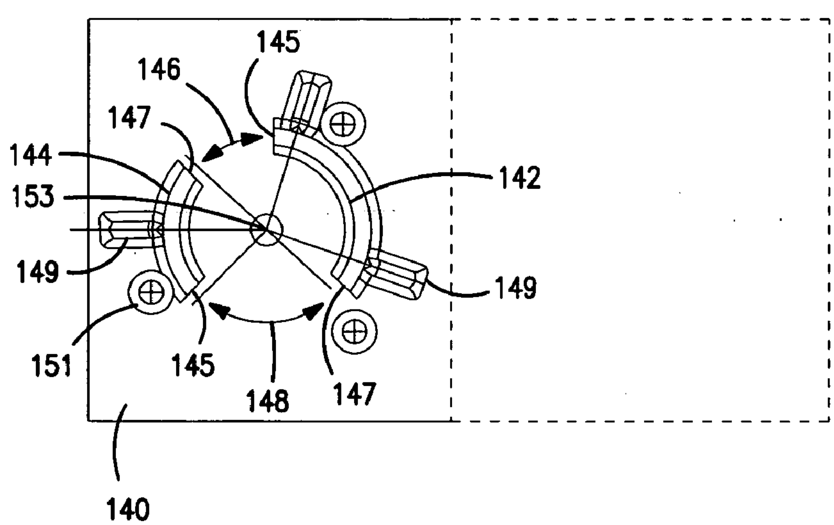
FIG. 7 is a top view, broken away and partly shown in phantom of the dereefer housing of FIG. 6.

FIGS. 4–7 illustrate a representative housing 140 incorporating one preferred configuration for the arcuate walls 142, 144. The dereefer housing 140 defines fastener openings 151 through which fasteners may be inserted to secure a triggering device. The housing 140 also defines a shaft opening 153 through which, e.g, a shaft may pass to engage the knob 120. The illustrated embodiment shows reinforcing webs 149 extending from the representative housing 140 to support the arcuate walls 142, 144. Mechanical dereefers, for example, are frequently subjected to severe abuse and such reinforcement may be necessary to improve reliability of a setting mechanism in such a use environment. FIG. 5 is a reverse view of the representative housing illustrated in FIG. 4. The housing defines a cavity 150 for a triggering mechanism and associated release linkages (not illustrated). FIG. 7 clearly illustrates the angular spacing of the start faces 145 and timeout faces 147 of the gaps 146, 148.

Figure 10:
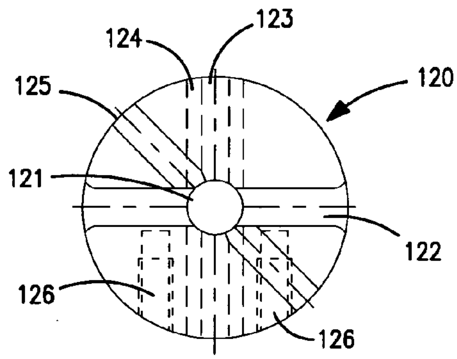
FIGS. 10–12 are top and side views of a timer knob appropriate for use in a timer-setting mechanism in accordance with the present invention with internal features shown in phantom.
Figure 11:
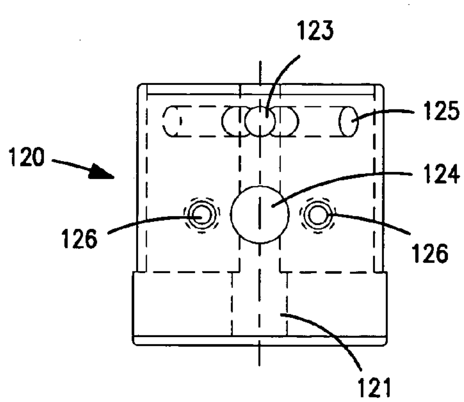
Figure 12:
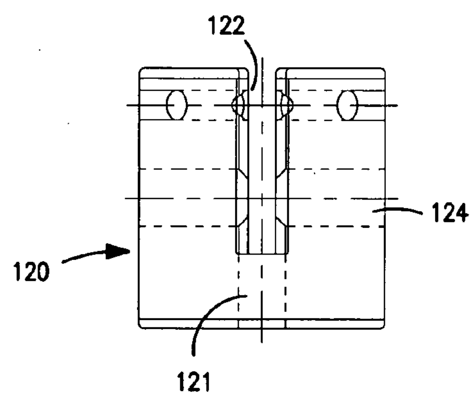

FIGS. 10–12 illustrate the knob 120 and its various features. An axial opening 121 is configured to receive a shaft projecting from a triggering device. The knob 120 is fixable to the shaft for rotation therewith. Those of skill in the art will understand that the knob may include a projection or projections for engagement with a rotating part of a triggering device other than a shaft as an alternative to the illustrated configuration. A slot 122 diametrically bisects the knob 120. The knob 120 defines a pivot pin opening 124 configured to receive a pivot pin (not illustrated) on which the selector lever 130 will pivot. Two bores 126 are configured to receive spring and ball check arrangements (not illustrated) to project into the slot 122 to engage a groove 132 or other depression in the selector lever 130.

Figure 13:
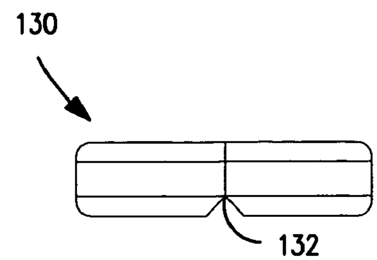
FIGS. 13–15 are exterior plan views of a selector lever suitable for use in conjunction with the timer knob illustrated in FIGS. 9–12 as part of a timer-setting mechanism in accordance with the present invention.
Figure 14:
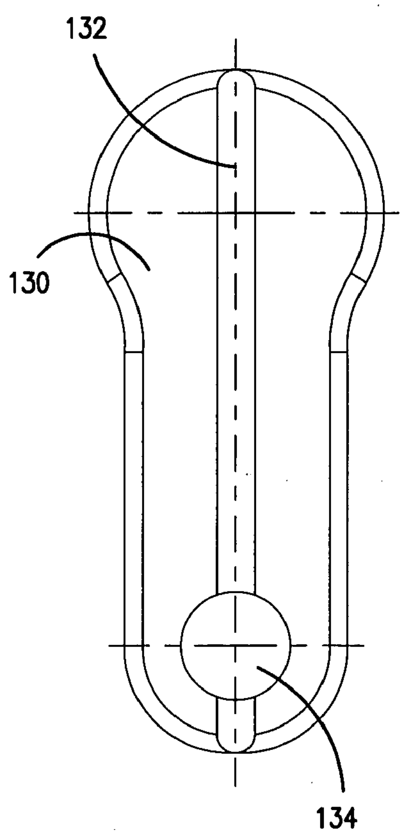
Figure 15:
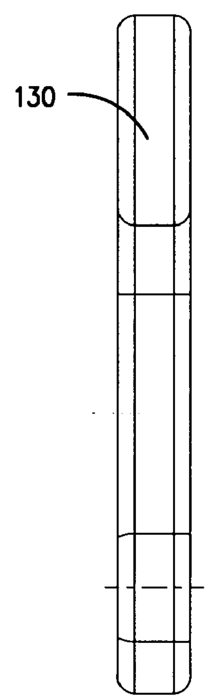

FIGS. 13–15 are several views of the selector lever 130. A pivot pin aperture 134 receives a pivot pin (not illustrated) passing through the pivot pin opening 124 defined in the knob 120 so that the selector lever 130 is pivotally retained to the knob 120. The selector lever 130 is pivotable over an arc of 180° to radially project from opposed sides of the knob 120. The selector lever groove 132 and spring-actuated balls (not illustrated) in bores 126 are arranged such that one or the other ball engages the groove 132 when the selector lever 130 is in either of its opposed positions. This spring-actuated ball/groove engagement releasably retains the selector lever in the selected position.

With reference to FIGS. 10–12, two pin-receiving apertures 123, 125 pass through the knob at alternative angular orientations relative to the slot 122. This permits one or the other of the pin-receiving apertures 123, 125 in the knob 120 to align with a release pin hole 141, 143 defined by one or the other of the arcuate walls 142, 144, depending upon the selected position of the selector lever 130.

FIGS. 2 and 3 illustrate the selector lever 130 positioned in the longer gap 148. To select the shorter of the two available gaps 146, the lever would be pivoted 180° to come to rest against the angularly opposite timeout face 147. The setting mechanism is then set and pinned as described above. When the release pin is removed, the knob will move the selector lever 130 over a rotational period corresponding to the shorter gap 146 with the radially projecting selector lever 130 coming to rest against the timeout face 147 associated with the shorter arcuate wall 144.

The illustrated embodiment shows a setting device that defines two alternative rotational periods for a knob. It should be understood that three, four or more alternative rotational periods for a knob may be defined using the principals and structures illustrated in this application. The invention claimed herein is intended to encompass such further embodiments.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A setting mechanism for a triggering device having a body and employing a rotating part to define a triggering point corresponding to a particular rotational position of said rotating part relative to said body, said setting mechanism comprising:

- a knob fixed to said rotating part for rotation therewith;
- a selector carried by said knob, said selector selectively fixable relative to said knob in a plurality of alternative positions to radially project from said knob at different angles; and
- at least one start abutment disposed in fixed relationship to said body to intersect a rotational path of said selector,
- wherein the selector is fixed in a position selected from said plurality of alternative positions and said knob is rotated to bring said selector to bear against said start abutment to define a selected rotational period for said knob between said start abutment and said triggering point.

2. The setting mechanism of claim 1, comprising a plurality of start abutments, wherein each start abutment in combination with a selector fixed in a position selected from said plurality of positions, defines a different rotational period for said knob.

3. The setting mechanism of claim 2, wherein only one of said plurality of selector positions is compatible with each said start abutment.

4. The setting mechanism of claim 1, wherein said rotational period is representative of a selected period of time.

5. The setting mechanism of claim 1, wherein said rotating part is a shaft and said knob is fixed to said shaft for rotation therewith.

6. The setting mechanism of claim 1, wherein said start abutment is defined by an arcuate wall partially coaxially surrounding said knob.

7. The setting mechanism of claim 6, comprising a plurality of said arcuate walls defining a plurality of start abutments, wherein each start abutment in combination with a selector fixed in a position selected from said plurality of positions, defines a different rotational period for said knob.

8. The setting mechanism of claim 7, wherein each said arcuate wall defines a hole and said knob defines a plurality of apertures such that one aperture aligns with one of the holes when said selector is positioned against each said start abutment.

9. The setting mechanism of claim 6, wherein said arcuate wall defines a hole, said knob defines a complementary aperture and said hole and said aperture align when said selector is against said start abutment.

10. The setting mechanism of claim 1, wherein said selector pivots diametrically across said knob.

11. The setting mechanism of claim 1, comprising two arcuate walls that partially coaxially surround said knob, said arcuate walls each defining one said start abutment and wherein said selector pivots diametrically across said knob and said plurality of available positions comprises two diametrically opposed positions, only one of said diametrically opposed positions being compatible with each said start abutment to define two different rotational periods for said knob.

12. A setting mechanism for a trigger in which a predefined rotational position of a rotating part relative to a trigger body designates a trigger position, said setting mechanism comprising:

- a knob fixed to said rotating part for rotation therewith;
- selector means for radially projecting from said knob in a selected one of a plurality of angularly spaced directions; and
- start abutment means for defining at least one start abutment fixed relative to said trigger body and positioned to intersect a path of said selector means during rotation of said rotating part,
- wherein the selected angular direction of said selector means and the position of said start abutment means relative to said trigger position together define a selected rotational period for said rotating part.

13. The setting mechanism of claim 12, wherein said at least one start abutment means comprises a plurality of start abutments, each said start abutment compatible with a selected angular direction to define a plurality of alternatively selectable rotational periods for said rotating part.

14. The setting mechanism of claim 13, wherein the knob defines a plurality of apertures and each said start abutment comprises a start face of an arcuate wall defining a hole and partially surrounding the knob, one said hole aligning with one said aperture for a knob position corresponding to the selector abutting a start face.

15. The setting mechanism of claim 12, wherein said trigger is a timer.

16. The setting mechanism of claim 12, wherein said knob comprises at least one radial slot and said selector means comprises a lever alternatively positionable in said at least one radial slot.

17. The setting mechanism of claim 16, wherein said at least one radial slot comprises two diametrically opposed slots and said lever pivots diametrically across the knob.

18. The setting mechanism of claim 12, wherein said start abutment means comprises a start face on an arcuate wall partially surrounding said knob.

19. A setting mechanism for a timer having a timer body and employing a rotating part to select a time duration by rotation relative to the timer body of the rotating part in a first direction away from a time out position and measuring the selected duration by controlled rotation of said rotating part counter to said first direction back to said time out position, said setting mechanism comprising:

a knob fixed to said rotating part for rotation therewith, said knob having a rest position corresponding to said time out position;

a selector carried by said knob, said selector selectively fixable to radially project from said knob at one of a plurality of anglular displacements relative to said rest position; and a plurality of arcuate wall segments partially surrounding the knob in substantially coaxial relationship thereto to define a plurality of arcuate paths of different lengths between said wall segments, wherein one of said plurality of angular displacements is compatible with each of said arcuate paths to define a rotational period corresponding to movement of said selector along said arcuate path, the length of said arcuate path corresponding to a predetermined time duration.

20. The setting mechanism of claim 19, wherein said plurality of arcuate wall segments comprises two arcuate wall segments defining two arcuate paths and said selector comprises a lever that pivots diametrically across said knob.

21. The setting mechanism of claim 20, wherein each said wall segment comprises a start face and defines a hole and said knob defines an aperture complementary to each hole such that one said hole and its complementary aperture align when the knob is in a position corresponding to the selector abutting a start face.

* * * * *